(No Model.)
J. O. GORDON.
COMBINED END GATE AND SCOOP BOARD.
No. 319,229.     Patented June 2, 1885.
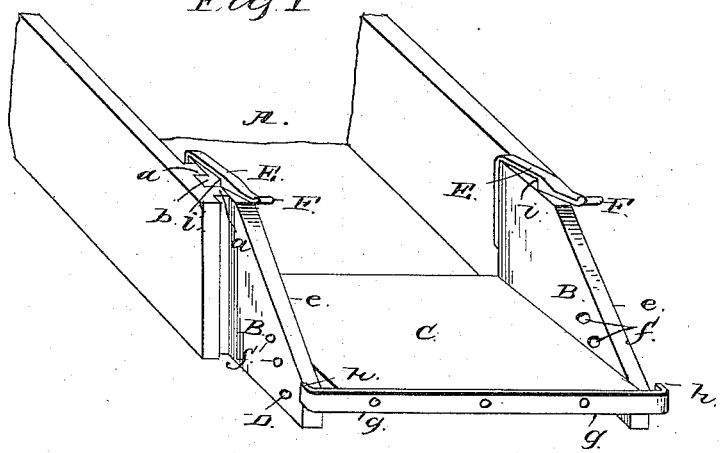
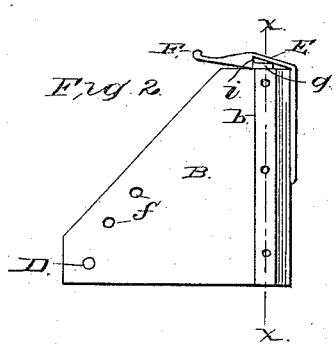
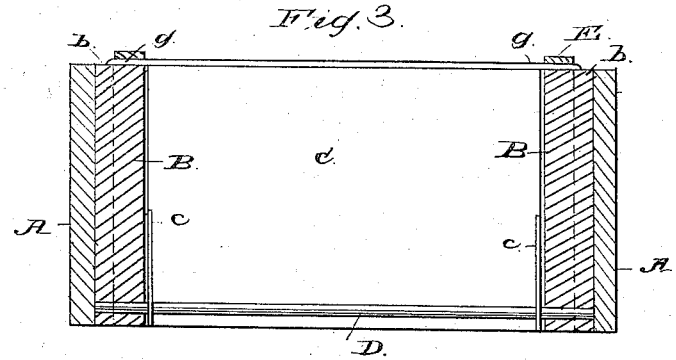
WITNESSES
M. E. Fowler
E. G. Siggers
INVENTOR
J. O. Gordon
by C. A. Snow
Attorneys

UNITED STATES PATENT OFFICE.

JOHN OTHO GORDON, OF INDEPENDENCE, KANSAS.

COMBINED END-GATE AND SCOOP-BOARD.

SPECIFICATION forming part of Letters Patent No. 319,229, dated June 2, 1885.

Application filed March 20, 1885. (No model.)

*To all whom it may concern:*

Be it known that I, JOHN O. GORDON, a citizen of the United States, residing at Independence, in the county of Montgomery and State of Kansas, have invented a new and useful Improvement in End-Gates and Scoop-Boards Combined, of which the following is a specification, reference being had to the accompanying drawings.

My invention relates to a combined end-gate and scoop-board; and it has for its object to provide improved means for holding the gate in a raised position and to guide it when being lowered, and to provide improved means for supporting the gate in a lowered position.

A further object of the invention is to provide a combined end-gate and scoop-board which shall be simple in its construction, one that will be strong and durable, and may be manufactured at a slight cost.

With these ends in view the invention consists in the combination, with a wagon-body, of wings or strips adapted to be secured thereto, and a pivoted gate provided with catches.

The invention further consists in the improved construction and combinations of parts, hereinafter fully described, and pointed out in the claim.

In the drawings, Figure 1 is a perspective view of a portion of a wagon-body, showing my improved combined end-gate and scoop-board applied thereto, the gate being lowered. Fig. 2 is a side elevation of my improvement detached, and Fig. 3 is a section on the line $x\ x$ of Fig. 2.

In the accompanying drawings, in which like letters of reference indicate corresponding parts in all the figures, A represents a portion of a wagon-body, the sides of which are provided on their inner sides, adjacent to their rear ends, with guide-cleats $a$.

B represents wings or strips, which are provided on their outer sides, near their forward ends, with cleats $b$, which are adapted to fit between the guide-cleats $a$ on the inner sides of the wagon-body.

C represents the gate, which is provided on its ends, at the lower corners thereof, with downwardly-extending plates $c$, which are provided with holes or openings. The gate C is pivoted between the wings or strips B by means of a rod or bar, D. The rear ends of the wings or strips B are inclined downwardly, as shown at $e$, and said wings or strips are connected at their lower ends by a bar or rod, D, which is adjustable in a series of holes or openings, $f$, formed in said wings or strips.

The gate, when lowered, is adapted to rest upon the bar or rod D and be supported thereby. The inclination of the gate may be varied by raising or lowering the bar-rod D, as desired.

Upon the upper edge the gate C is provided with outwardly-extending plates $g$, having downturned ends $h$, which are adapted to fit over the upper edges of the wings or strips B and guide and steady the gate when raised or lowered.

Upon the upper ends of the wings or strips B are provided spring-plates E, formed upon their under sides with recesses or seats $i$, to receive the plates $g$, said plates E having finger-pieces F, by which they may be raised to disengage the plates $g$.

The gate, when in a raised position, is held in place by the spring-plates E engaging the plates $g$ on the gate, and to disengage the gate the plates E are raised, thus releasing the plates $g$ and allowing the gate to be lowered.

The gate, when lowered, rests upon the bar or rod D, and is supported by the same. As the wings or strips B extend beyond the sides of the wagon, it will be seen that when the gate is lowered the said strips, in connection with the gate, form a scoop-board.

My improvements before described are simple in their construction, readily and easily applied, strong and durable, and convenient and efficient for the purposes intended.

Having fully described my invention, what I claim as new, and desire to secure by Letters Patent, is—

The wings or strips having cleats upon their outer sides, a gate pivoted between said wings, a bar connecting the wings and adapted to support the gate when lowered, in combination with guide-cleats secured to the inner sides of the body, spring-catches on said guide-cleats, and a plate or plates, $g$, having bent ends, as shown, and for the purpose set forth.

In testimony that I claim the foregoing as my own I have hereto affixed my signature in presence of two witnesses.

JOHN OTHO GORDON.

Witnesses:
JOHN C. MATTHEWS,
WILLIAM L. GORDON.